March 1, 1960  W. F. MacGLASHAN, JR., ET AL  2,926,694
AIR CUT-OFF VALVE
Filed Jan. 2, 1958

INVENTORS,
William F. MacGlashan, Jr.
Harry J. Margraf
Clyde R. Seitz
BY
W. E. Thibodeau & J. J. Lynch

2,926,694
AIR CUT-OFF VALVE

William F. MacGlashan, Jr., and Harry J. Margraf, Los Angeles County, and Clyde R. Seitz, Pasadena, Calif., assignors to the United States of America as represented by the Secretary of the Army Application January 2, 1958, Serial No. 706,877

3 Claims. (Cl. 137—544)

The invention described herein may be manufactured and used by or for the Government for governmental purposes without the payment of any royalty thereon.

This invention relates to an air cut-off valve, and more particularly to valves operated by variations in pressure in a system in which air is to be supplied under constant pressure to pressurize for example fuel tanks and the like.

It is a principal object of this invention to provide an air cut-off valve normally in closed position wherein the upstream side is sealed but the downstream side is vented to atmosphere.

It is another object of this invention to provide a valve opened by application of sensing pressure applied to a piston at one end of the valve pintle or spool.

It is a still further object to provide a valve arranged to close and simultaneously vent the downstream side when the sensing pressure drops below a predetermined value.

The specific nature of the invention as well as other objects and advantages thereof, will clearly appear from a description of a preferred embodiment as shown in the accompanying drawing in which.

Figure 1:
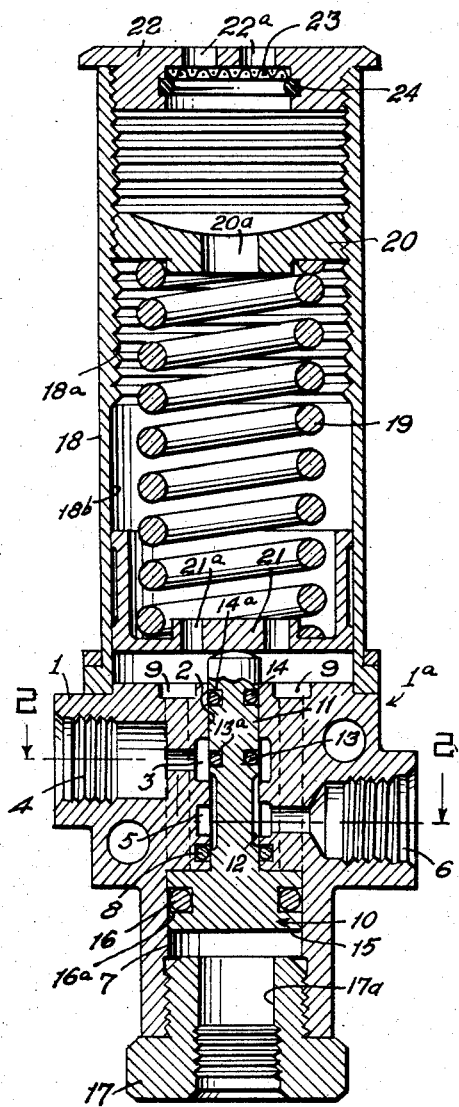
Fig. 1 is a vertical section taken through a valve constructed in accordance with the invention and illustrating the valve mechanism in open position.

Referring more particularly to the drawings wherein like reference characters designate like or corresponding parts throughout the different views, reference character 1a indicates the air cut off valve having a valve body 1, an axial bore 2 therein enlarged to form an annular channel 3 coaxial of bore 2 and communicates with inlet port 4. A second enlargement axially spaced from channel 3 forms an annular channel 5 coaxial of bore 2 and communicates with an outlet port 6. The end of the bore 2 adjacent the outlet channel 5 is counterbored as at 7. Between counterbore 7 and outlet channel 5, there is provided a seal ring 8. A series of radially spaced axially parallel ports 9 are provided in the valve body 1 and extend from counterbore 7 to the opposite end of valve body 1.

A valve pintle generally indicated by 10, is slidably mounted in bore 2 and includes a stem 11 having its peripheral surface cut to provide longitudinal serrations 12, the length of the serrations 12 bridging the inlet channel 3 and outlet channel 5 when the valve is open, as shown in Fig. 1, and to bridge the outlet channel 5 and counterbore 7 when the valve is closed. The stem 11 is provided with an O-ring seal 13 seated in an annular channel 13a movable between the inlet channel and that portion of the valve bore 2 between the inlet channel 3 and outlet channel 5. A second O-ring 14 seated in an annular channel 14a is provided on the stem 11 and is moveable in the bore 2 in the region beyond inlet channel 3. The pintle is provided with a head 15 integral to stem 11 and is adapted to slide in counterbore 7. The head 15 is provided with a seal ring 16 seated in an annular channel 16a. The head 15 and seal ring 16 functions as a piston within counterbore 7. An adapter plug 17 having an axial port 17a is threadably mounted in counterbore 7 for connection to a pressure line 29 of Fig. 3, and to limit axial movement of the pintle 10.

At the opposite end of the valve body 1, there is mounted a cylindrical sleeve member 18. The sleeve 18 is internally threaded for a distance along approximately one half of its length as at 18a and the remainder of the interior of the sleeve is smooth as at 18b. A coil spring 19 is disposed within the sleeve 18, one end of which bears against an adjusting screw 20, having a central port 20a, mounted in the sleeve 18 by threads 18a. The other end of spring 19 bears against a plug 21 slidably mounted in the smooth portion 18b of sleeve 18. The plug 21 is provided with axially disposed ports 21a. Sleeve 18 is closed by a plug 22 threadably engaged in threads 18a and is provided with axially aligned ports 22a. A filter element 23 is secured within plug 22 by a ring 24 to protect ports 22a.

Figure 3:
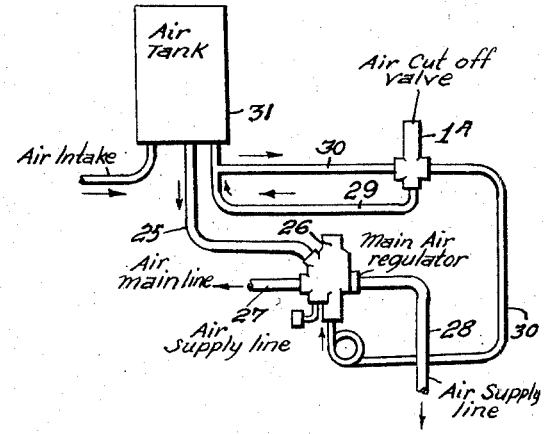
Fig. 3 is a diagrammatic view of a portion of an air supply system in which the valve of the invention is to be employed.
Figure 2:
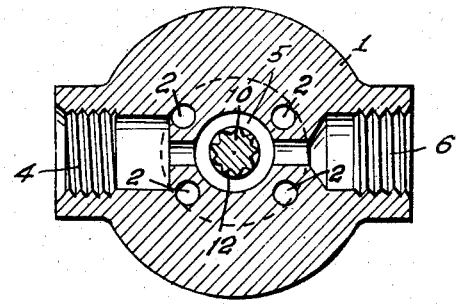
Fig. 2 is a cross section view taken along line 2—2 of Fig. 1 and looking in the direction of the arrows.

An example of a practical application of the cut-off valve of the invention is illustrated in Figure 3 in which an air supply system consists of an air reservoir 31 containing air at a predetermined pressure. 25 represents a main air supply line, 26 a main line regulator, 27 and 28 air supply lines.

As long as the air pressure in reservoir 31 remains above a predetermined minimum pressure, cut-off valve 1A will remain open due to air pressure in line 29 acting against piston 15 to keep the cut-off valve open. Air pressure through line 30 will act to keep regulator 26 open and allow air to flow through supply lines 27 and 28. Upon lowering of air pressure in reservoir 31 below the predetermined point, cut-off valve 1A will close causing regulator 26 to be closed because one side of the air regulator will be vented to atmosphere through that portion of line 30 between the air regulator 26 and the cut off valve 1A. When shut off no air passes through the air regulator 26 from line 25 to lines 27 and 28 and none of the air in the tank 31 passes to atmosphere through valve 1A since the upstream side of the valve is sealed off as more clearly shown hereinafter.

The operation of the valve per se is as follows:

Upon application of a predetermined pressure at piston 15 sufficient to overcome the spring 19, the valve assumes the open position shown in Fig. 1, wherein flow may occur from the inlet channel 3 to the outlet channel 5 through the longitudinal serrations 12. If the pressure applied against the head or piston 15 drops below a predetermined value, then the spring 19 forces the pintle 10 to its other extreme position wherein the O-ring 13 isolates the channel 5 from the inlet channel 3. Under this condition the longitudinal serrations 12 provide the connection between the outlet channel 5 and the counterbore 7 so that the pressure in the outlet may bleed through the ports 9 into the sleeve 18 and through the ported plug 22 and filter element 23 while the pressure at inlet 4 is sealed against escape.

From the foregoing description it will be apparent that a highly efficient air cut-off valve has been devised that is positive of action yet possessing a minimum of moving parts. The entire structure is so arranged that replacement of any part thereof, may be quickly made.

While a preferred form of the invention has been shown and described, various modifications and substitutions of equivalents will occur to those skilled in the art after a study of the foregoing disclosure. Hence, the disclosure should be taken in an illustrative rather than a limiting sence, and it is the desire and intention to reserve all modifications within the scope of the subjoined claims.

What is claimed and desired to be secured by United States Letters Patent is:

We claim:

1. In an air cut-off valve, a valve body having an axially disposed bore and a coaxial counter bore therein, said bore being intersected by offset inlet and outlet channels, and said valve body having a series of radially spaced axially parallel ports communicating between said counter bore and the opposite side of the valve body, a valve pintle member including a stem portion and a head portion, said stem portion slidable in said axial bore and said head portion being slidable in said counter bore, said stem portion being provided with longitudinally disposed serrations around its peripheral surface providing alternate communication between said inlet channel and said outlet channel and said counter bore upon axial movement of said pintle to its open and its closed position respectively, an adapter plug having an axial port threadably mounted at one end of said counter bore in said valve body, limiting axial movement of said head portion of said pintle in said counter bore, a cylindrical sleeve member mounted to the opposite end of said valve body, its interior wall defining an outer threaded portion and an inner smooth surface, a coil spring axially disposed within said sleeve member, an adjusting plug having a centrally disposed port, threadably mounted in said threaded portion of said sleeve and engaging one end of said spring, a cup shaped plunger having a series of radially spaced, parallel ports, slidable in said smooth portion in said sleeve and receiving the other end of said spring, the bottom of said cup member bearing on said stem portion of said pintle, a closure plug having a series of ports threadably mounted at the outer end of said sleeve member, and a filter element secured in said closure plug adjacent the inner ends of said ports therein.

2. In an air cut-off valve as claimed in claim 1, wherein said longitudinally disposed serrations are adapted to bridge between said inlet and said outlet channels when said pintle is in open position and to bridge between the outlet port and said counterbore when said pintle is in closed position.

3. In an air cut-off claimed in claim 1, sealing means carried by said stem portion of said pintle comprising first and second O-rings, said first O-ring movable between said inlet channel and a portion of said axial bore between said inlet channel and said outlet channel, said second O-ring movable in a region beyond said inlet channel.

References Cited in the file of this patent

UNITED STATES PATENTS

| | | |
|---|---|---|
| 1,314,195 | Jarvis | Aug. 26, 1919 |
| 2,210,295 | Johnson | Aug. 6, 1940 |
| 2,485,504 | Morgan | Oct. 18, 1949 |
| 2,490,510 | Carleton | Dec. 6, 1949 |
| 2,705,020 | Frantz | Mar. 29, 1955 |
| 2,723,681 | MacGlashan et al. | Nov. 15, 1955 |